United States Patent [19]

Cheek et al.

[11] Patent Number: 4,603,399
[45] Date of Patent: Jul. 29, 1986

[54] DATA PROCESSING APPARATUS FOR ADDRESS SUBSTITUTION

[75] Inventors: Elbert A. Cheek; David R. Thomas; John D. Zbrozek, all of Lexington, Ky.

[73] Assignee: International Business Machines Corporation, Armonk, N.Y.

[21] Appl. No.: 565,792

[22] Filed: Dec. 27, 1983

[51] Int. Cl.$^4$ .................... G06F 12/10; G06F 12/12
[52] U.S. Cl. .................................................. 364/900
[58] Field of Search ... 364/900 MS File, 200 MS File

[56] References Cited

U.S. PATENT DOCUMENTS

| 4,028,678 | 6/1977 | Moran | 364/900 |
| 4,141,068 | 2/1979 | Mager et al. | 364/200 |
| 4,319,343 | 3/1982 | Powell | 365/109 |
| 4,400,798 | 8/1983 | Francis et al. | 365/174 |

OTHER PUBLICATIONS

"Replacing Portions of Read-Only Store Modules with Random-Access Memory Bits", by D. W. Westcott, vol. 17, No. 10, Mar. 1975, pp. 2915–2916.

"Microcode Memory Changes", by M. Enser, vol. 21, No. 1, Jun. 1978, pp. 341–342.

"Alterable-Patch Circuits for Read-Only Storage", by J. L. Regehr, vol. 23, No. 10, Mar. 1981, pp. 4627–4628.

"Short and Long ROS Patch", by H. Trinh, vol. 24, No. 3, Aug. 1981; pp. 1379–1382.

"Terminal Microcode Load/Patch Facility", by F. L. Huss et al, vol. 24, No. 10, Mar. 1982, pp. 5273–5274.

*Primary Examiner*—James R. Hoffman
*Attorney, Agent, or Firm*—John A. Brady

[57] ABSTRACT

Data from a patch memory (23) is substituted for that in a system ROM (9) by applying high order addresses to a standard PLA (19) having word lines (FIG. 3, 50a-50p). The address orders are separately applied to EXCLUSIVE OR circuits (27a-27g). The PLA (19) is personalized to activate line (21) at addresses to be substituted and to provide logical zeros to the EXCLUSIVE OR circuits (27a-27g) which change during the patch. Only one word line is required for each continuous patch, which vary in size on a patch-by-patch basis. The circuit is fast and efficient. It can be used for a wide variety of memory substitution applications.

16 Claims, 4 Drawing Figures

DATA PROCESSING APPARATUS FOR ADDRESS SUBSTITUTION

DESCRIPTION

1. Technical Field

This invention relates to data processing apparatus for achieving translation of addresses to different addresses. This is particularly significant for uses involving the substitution of information from one memory where normally information from another would be used. This is known as patching when the information in the first memory has been noted as fauty or as otherwise requiring change after the content of that memory has been fixed. Patching is typicaly employed with the type of memory which is unalterable, that is a read only memory (ROM), to achieve modification of overall data from memory.

2. Background Art

This invention achieves by apparatus or hardware memory substitution or patching of variable lengths closely related to the size of the desired memory substitution. *IBM Technical Disclosure Bulletin* articles entitled "Short and Long ROS Patch," by H. Trinh, Vol. 24, No. 3, August 1981, at pp. 1379-1382, and entitled "Terminal Microcode Load/Patch Facility," by F. L. Huss et al, Vol. 24, No. 10, March 1982, at pp. 5273-5274, disclose variable length patches using programming or software techniques. These techniques rely upon instruction coding to a data processing machine to define the length of the patch. As is common in patching and as is employed in addition to the basic invention described here, the lowest order of addresses of the former address are used directly to define a lowest orders of addresses in the memory which is substituted or "patched in" for the prior memory. That appears, for example, in the foregoing article entitled "Short and Long ROS Patch."

Additionally, *IBM Technical Disclosure Bulletin* articles as follows are illustrative of fixed length patching using low order address bits unchanged: "Microcode Memory Changes," by M. Enser, Vol. 21, No. 1, June 1978, at pp. 341-342, and "Alterable-Patch Circuits for Read-Only Storage," by J. L. Regehr, Vol. 23, No. 10, March 1981, at pp. 4627-4628.

U.S. Pat. No. 4,400,798 to Francis et al, U.S. Pat. No. 4,319,343 to Powell and U.S. Pat. No. 4,141,068 to Mager et al are of more general interest in that they are representative of known current patent activity in this field.

This invention employs a pass-through of information of certain low order address signals. This is achieved by a selection of proper information to be applied to logic having the effect of EXCLUSIVE OR logic. The use of a logic technique to pass through data, but not in a manner which defines patch or substitution address length, appears in *IBM Technical Disclosure Bulletin* article entitled "Replacing Portions of Read-Only Store Modules with Random-Access Memory Bits," by D. W. Westcott, Vol. 17, No. 10, March 1975, at pp. 2915-2916.

DISCLOSURE OF THE INVENTION

An address substitution or patching system is achieved in accordance with this invention by employing logic to receive the address intended for a first memory. A typical address may be 20 individual signals, each of sequential significance from the lowest order to the highest order, as is conventional. The number of individual address signals for the memory being substituted may be as low as in the order of magnitude of 10 while still achieving advantages in accordance with this invention, although nothing in the invention itself limits it to a minimum number.

In preferred forms of this invention, the address bits are applied into a logic array which preferably in commercial applications will be an alterable programmable logic array (PLA). A suitable PLA is a fuse programmable field PLA. PLAs programmed at a factory by a mask or the like are undesirable because of delays involved.

The same address signals which are applied to the logic array are applied unchanged to pass-through logic, individual elements of which receive one of the address bit signals and one of the outputs from the logic array. The logic is personalized so that signals corresponding to low order addresses for the length of the patch are a predetermined significance, for example, zeros where the logic is EXCLUSIVE OR logic. The higher order bits correspond to the unchanging parts of the address in a substitution or patch memory. They are personalized to produce the unchanging part of the patch address from the output of the logic elements to which each is the input. In the preferred embodiment, the logic array also produces a signal to enable a patch memory and disable a ROM.

As the address for a patch block increments for the length of the desired patch, the incremental changes in address are passed through the logic elements without change. In the context of a logic array having word lines, only one word line is required for each such patch regardless of size. Typically, a commercially available logic array will have a limited number of word lines, less than seventy.

Response occurs directly from sensing address signals, and minimal time is required for typical array logic to react or settle. Similar reduction in required hardware and good response can be realized from other implementations, such as by special purpose logic personalized from random access memory. This invention is applicable to virtually any address-selected data processing memory system.

BRIEF DESCRIPTION OF THE DRAWINGS

The details of this invention will be described in connection with the accompanying drawing in which.

BEST MODE FOR CARRYING OUT THE INVENTION

Figure 1:
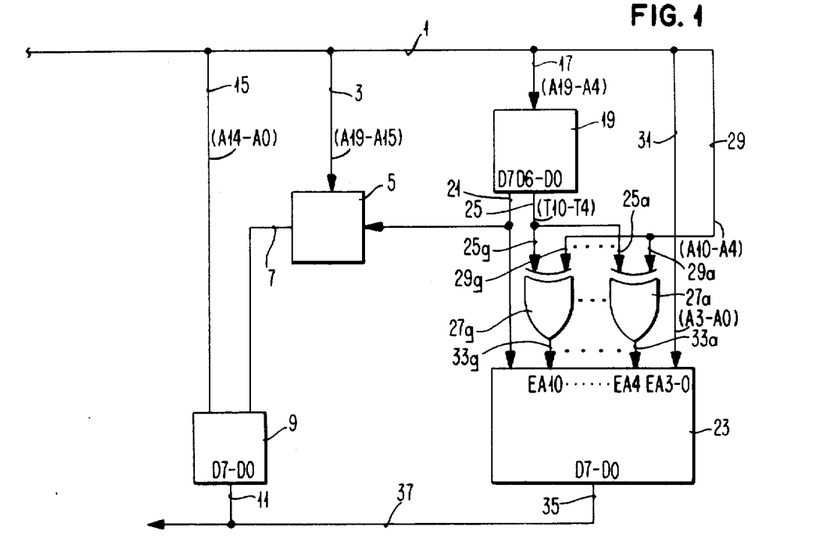
FIG. 1 is an illustration of the significant elements of a patching system in accordance with this invention in which increased substitution length is obtained by separating out and not changing the four lowest order address signals.

The address bus 1 in FIG. 1 comprises twenty individual address lines, each line having significance of one ordinal of a natural binary number. The addresses carried are binary in the sense that each line carries a significance of either one or zero by a predetermined electrical signal carried on the line. Such addressing, using individual orders in the sequence of natural binary numbers, is entirely standard in data processing arts at this time. The five highest order signals, designated A15-A19, are communicated through bus 3 to chip select logic 5. Where the five signals conform to the preselected chip select logic, a signal is generated on line 7 to select a standard, read only memory (ROM) 9.

ROM 9 typically is a commercially available memory carrying binary data at each memory site represented by structure which is fixed. The data is therefore not alterable after the memory is manufactured. A representative ROM 9 would be a silicon chip in metal oxide semiconductor technology having 32K (nominally, 32 thousand) 8 bit bytes of memory. Output bus 11 comprises eight lines which receive the 8 bit bytes in parallel. Address signals A0-A14 are applied as addresses to ROM 9 on address bus 15, comprising one line for each of the address signals.

The foregoing comprises an entirely standard system of a ROM and means to address the ROM. In accordance with this invention, address bus 1 is also connected to input bus 17 to field programmable logic array (PLA) 19. Bus 17 comprises separate lines carrying the sixteen address orders of highest significance, A19-A4, of the address on bus 1.

The details of the preferred PLA 19 are dictated by commercial availability. The most suitable available, receives sixteen separate input signals, contains forty-eight word lines, and produces eight output signals in parallel. In this embodiment, one of the eight output signals is produced on line 21, where it functions to disable chip select logic 5 and enable or select patch memory 23.

Patch memory 23 preferably may be a standard, commercially available erasable programmable read-only memory (EPROM). This is a device which is manufactured without specific data in the memory and which may be coded with selected data (personalized), by individuals using special equipment away from the manufacturing site. (Commonly, the device is erased by ultra violet radiation. It is then programmed electrically by addressing memory sites.)

The other seven outputs from PLA 19 appear on logic bus 25, having individual lines 25a through 25g, each connected as one of two inputs to different ones of EXCLUSIVE OR logic elements 27a through 27g. The second input to EXCLUSIVE OR elements 27a through 27g, are from parallel address bus 29, comprising seven individual lines, carrying the fifth address order in significance, A4, through the eleventh address order in significance, A10. Address order A4 is applied on line 29a as the second input to EXCLUSIVE OR element 27a. The higher order addresses are applied in sequence as the second input to the other EXCLUSIVE OR element, with, for example, the highest order being applied on line 29g as the second input to EXCLUSIVE OR element 27g.

A second parallel address bus 31, comprising four individual lines, carries the four least significant address orders, A0 through A3, bypassing PLA 19 and logic elements 27a through 27g, and being connected to the EPROM 23 as lowest order address signals, EA0 through EA3, with A0 applied as EA0, A1 applied as EA1, and the others applied in the same sequence.

This is done to compensate for the small number of outputs available in presently available PLAs, which would require patches of impractically small lengths if the lowest order signals were provided by the PLA. In an optimal implementation, all address signals would pass through the PLA 19 as described and the PLA 19 would have sufficient outputs (line 25) to provide patches of adequate length.

The output of logic 27a is applied on line 33a as the address of next highest significance, EA4, while the output of the related logic elements are similarly applied, with the output of element 27g being applied on line 33gg as EA10, the address order of highest significance to EPROM 23. The signal on line 21 is applied to select EPROM 23, the selection or activation of EPROM 23 by signal at an input (often denominated CS or chip select) being a standard capability.

The output of EPROM 23 is eight binary data bits in parallel on output bus 35. Both ROM 9, when selected, and EPROM 23, when selected, apply through their output buses 11 and 35 eight bits of data on a conventional data bus 37, of eight individual lines. Bus 37 transmits data for general use in a data processing system. Since the same signal on line 21 which selects EPROM 23 disables ROM 9, data on bus 37 will be either from ROM 9 or EPROM 23, but not from both simultaneously.

Selection between ROM 9 and EPROM 23 depends upon the personalization of PLA 19. Where the signals A19 through A4 on bus 17 are not those for which PLA 19 is personalized to respond by activating line 21, data will be supplied by ROM 9, provided that signals A19 through A15 on bus 3 are those to which select logic 5 is designed to respond by applying a select signal on line 7. (Typically, of course, a system will have memories other than ROS 9 which are selected by other combinations of A19 through A15.) Address signals on bus 15 typically have large portions which increment one natural binary number at a time to supply data, although the address on bus 15 may differ greatly from the preceding address where a branch in a program or the like is to being executed. In this preferred embodiment, such addresses and changes in address are conventional as just described.

At any address, PLA 19 may be personalized to respond to the signals on bus 17 to provide an active signal on line 21. Where this occurs, PLA 19 will also be personalized to provide logic zero signals on bus 25 for those signals connected as inputs to EXCLUSIVE OR elements 27a through 27g which will change during the continuous address sequence at which A4 through A19 will activate line 21 and provide a fixed set signals on bus 25.

For example, the memory substitution or patch address may be between addresses 1101110111010000000 and 11011101110111111111 (with A0 appearing on the right, as is conventional). It will be appreciated that the patch boundary begins when the designated high orders are those predefined. In the example, A8 through A19 are identical and this is used to achieve a single, continuous selection on line 21 and bus 25 by PLA 19. (Addresses which change at orders higher than A10 are larger than EPROM 23 can respond to as one continuous selection. This is true because EPROM 23, the patch memory, would not be as large as the patch block.) In the example, the address changes for A0 through A7, while A8 through A19 remain unchanged. In accordance with this invention, PLA 19 is personalized to provide a signal of logic zero significance (as distinguished from logic one significance) on lines on bus 25 corresponding to A4 through A7. Accordingly, line 25a supplies a zero as an input to EXCLUSIVE OR 27a, line 25b (suggested, not shown) supplies a zero to EXCLUSIVE OR 27b (suggested, not shown), line 25c supplies a zero to EXCLUSIVE OR 25c, and line 27d supplies a zero to EXCLUSIVE OR 25d. As signal A4 is applied as the second input to EXCLUSIVE OR 27a, and as EXCLUSIVE OR is defined as logic which produces a one when the inputs differ, the A4 signal will appear on line 33a as the output of Exclusive Or 27a. The three next more significant signals immediately above A4 are applied to EXCLUSIVE OR circuits 27b through 27d as described. Since the inputs on lines 25b through 25d are zero in this example, the address signals A5 through A7 appear on output lines 33b through 33d unchanged. They are effectively "passed through" the EXCLUSIVE OR logic 27b, 25c and 27d unchanged.

PLA 19 is personalized to provide unchanging parts of an address in EPROM 23, which may be different in any unchanging address order from that of the address on bus 1. The specific unchanging part of the address depends on where the corresponding data is stored. Generally data will be stored in the next available storage position. All memory positions in a typical standard memory system such as EPROM 23 are accessed by addresses in the form of sequentially larger natural binary numbers. Generally, data will be stored in any available storage position, but the position selected must have sufficient memory length.

In the foregoing example, assuming the address of an available region in EPROM 23 begins at 01100000000, PLA 19 is personalized so that the signal on line 25e (suggested, not shown) to EXCLUSIVE OR 33e (suggested, not shown) is a zero. The other input signal to EXCLUSIVE OR 33e from bus 29 is A8, which is a one. EXCLUSIVE OR 33e therefore provides a one on line 33e, which functions as Address EA8 of EPROM 23. At the same time, the signal on line 25f to EXCLUSIVE OR 27f is a one, PLA 19 being so personalized because A9 is zero and the substitution address requires a one. EXCLUSIVE OR 27f provides a one on line 33f. Similarly, PLA 19 is personalized to provide a one on line 25g, since A10 to EXCLUSIVE OR 27g is also a one and a zero in that order of the substitution address is required.

A patch with variable block size for each patch is achieved. Another significant advantage of this invention is in its suitability to being implemented by logic arrays having word lines. Such arrays are efficient, fast, readily implemented, and cost effective. Such an element is discussed in detail wth respect to FIG. 3.

The length of the substitutions to being "patched in" and the available space in EPROM 23 are known prior to personalization of PLA 19 and are the basis for that pesonalization. Correct data is duplicated in EPROM 23 and incorrect or data to be changed is stored in corrected to changed form an EPROM 23.

In the context of this invention, it can be helpful to equate each substitution or patch with the selection of a separate word line. This is true because each word line, which is selected by unchanging high orders, patches to a block as long as the length defined by lower changing oders, even though only part of the content of the lower orders may be different from the corresponding original information.

For example, assuming twenty orders of address signals, the highest thirteen of which are unchanging. The lower seven orders define a patch length of 128. A patch of that length, 128, must be provided in the EPROM 23. Normally, up to one-half of that length may contain duplicated data which is also in the EPROM. Information to be altered may begin, for example, with the lower seven addresses at all zeros (0000000). If the altered data ends at 69 (1000101), then the length of altered data is 70, but the total length of the patch is 128. The lowest unchanging address order is the eighth which changes at 128 address increments after the starting, 0000000, status. That change deselects the selected word line and terminates the patch.

The size of the patch may nevertheless be closely related to the length of the altered data. In the immediately preceding example, should the data to be altered be 50 in length and the starting lower orders be all zeros, then the lowest orders would read 0110001 at the end of the patch length required. Contrary to the previous example, in this case the seventh highest order is unchanged both before and after the necessary patch length. PLA 19 is personalized to respond to the address at that order, A6, and all of the higher address orders, being unchanging addresses. This illustrates the limiting of the use of patch memory, EPROM 23, to an amount directly related to the length of data to be altered, which is a fundamental advantage of this invention.

Of course, the address of the start of data to be altered may be at any memory location. Owing to the interactive nature of natural binary sequencing, a necessary patch length may end at an address having several high orders changed from the starting address, even though the patch is not correspondingly long. (In an arithmetic sense, this results from a single increment being translated by the carry operation, i.e. 111+1 being 1000.) Avoidance of patch length longer than one-half of the data to be altered may be achieved by dividing what could be a single patch having this address translation into two patches (at the cost of use of a second word line).

An example of a beneficial use of two patches even though the data to be altered in the two patches is continuous is as follows: The starting address of data to be altered is 01011000001110110011 and the ending address of that data is 01011000010000101111. These differ by only 124. Yet, the unchanging high orders are A11 and above, with the eleven lower orders changing and therefore defining a patch length of 2048. This long patch is avoided by dividing the foregoing into a patch from the beginning to the address immediately prior to the change having translation, i.e. from 01011000001110110011 to 01011000001111111111 and into a patch from 01011000010000000000 to 01011000010000101111. PLA 19 is personalized to select a word line when the ten highest address orders, A19-A10, are 0101100000, the unchanging ordinals for the first patch. That patch is 128 long, 52 of which correspond to data which need not be duplicated (i.e. from lower addresses 0000000 to 0110010). PLA 19 is also personalized to select another word line when the fourteen highest address orders, A19-A6 are 01011000010000, the unchanging ordinals of the second patch. That patch is 64 long, 16 of which correspond to the data which need not be duplicated (from lower addresses 110000 to 111111).

Figure 2:
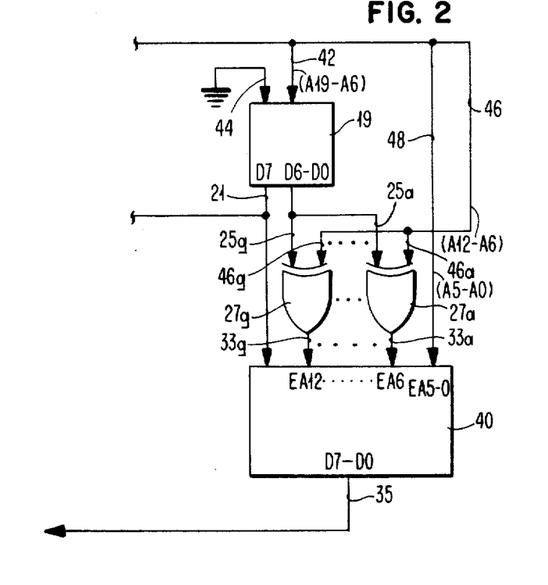
FIG. 2 is a generally very similar system in which a larger patch memory may be employed by separating out and not changing the six lowest order address signals, thereby accepting a lower minimum patch length in return for the benefit of the larger patch memory.

FIG. 2 illustrates an embodiment closely similar to that of FIG. 1 except that a larger patch memory EPROM 40 is employed. EPROM 40 is an 8K by 8 bit memory adapted to receive thirteen address inputs, A12 through A0, and is otherwise basically the same as EPROM 23 of FIG. 1. Elements which are essentially identical to those of FIG. 1 are given the same reference numerals and will not be discussed here in any detail.

The fourteen highest orders of the address on bus 1, A19 through A6, are applied by input bus 42 to PLA 19. Two inputs of PLA 19 are not used and are therefore shown connected to ground on bus 44. Parallel address bus 46 carries signals A12 through A6, where each is connected as one input to EXCLUSIVE OR logic elements 27a through 27g. The lowest order, A6, is connected as an input to EXCLUSIVE OR 27a and the others are connected in sequence to EXCLUSIVE OR circuits 27b through 27g. Seven outputs of PLA 19 appear on logic bus 25, having individual lines 25a through 25g, each connected to different ones of EXCLUSIVE OR logic elements 27a through 27g.

A second parallel address bus 48, comprising six individual lines, carries the six least significant address orders, A0 through A5, to EPROM 40 as lowest order address signals, EA0 through EA5, with A0 applied as EA0, A1 applied as EA1, and the others applied in the same sequence.

With the exception of the signals on address bus 48 defining sixty-four memory positions, rather than sixteen, the operation is identical to that described in connection with FIG. 1. EPROM 40 provides eight bit bytes on output bus 35 which is communicated on data bus 37.

Since bus 48 bypasses PLA 19, the smallest substitution unit possible will be 64 positions. This increases long substitutions not otherwise desirable, but it also increases the number of address orders, since the total is seven from PLA 19 plus those on bus 48. The high number or orders permits the larger 8K by 8 memory 40 to be addressed, while the smaller number in the FIG. 1 embodiment limited the number of address orders to 11, which permitted addressing of only a 2K by 8 memory 23.

Figure 3:
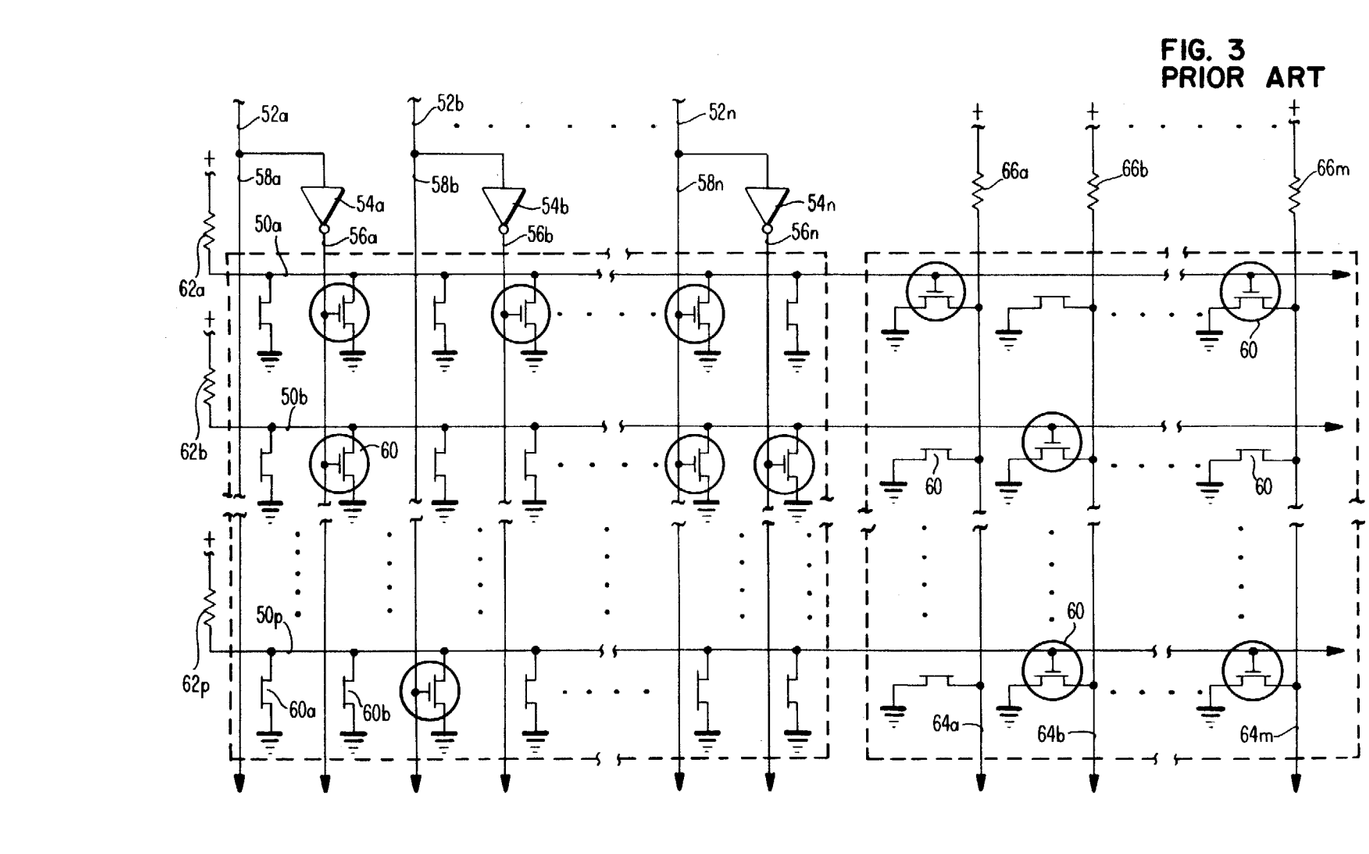
FIG. 3 is illustrative of basic elements of a logic array having word lines. The preferred embodiment uses an equivalent standard, commercially available programmable logic array, although one which is field programmable.

FIG. 3 is demonstrative only of a standard PLA. The PLA illustrated suggests factory programming or personalization by mask techniques. It is selected because it is clearly understood by the inventors of this application and may be definitively illustrated. Alterable PLAs including fied PLAs, are commercially available from various manufactures. Ready, field personalization is a characteristic preferred with the PLA used for this invention.

A major element of such an array is that it has a limited number of word lines 50a, 50b through 50p, which may be activated to produce coded output signals. The inputs, which are on input lines 52a, 52b through 52n, provide permutations vastly larger in number than the number of word lines 50a through 50p. Each input line 52a through 52n has the capability of being interconnected with any of the word lines 50a through 50p depending on the personalization. To positively respond to a low condition on an input 52a through 52n, each is connected in parallel with an individual inverter 54a through 54n, the output of each being on line 56a through 56n. The initial signal on lines 52a through 52n is carried into the array on lines 58a through 58n.

Each of the lines 58a through 58n and 56a through 56n may reverse the condition of the word lines 50a through 50p where a switch element 60 exists and is activated by a high potential on one of the lines 58a through 58n and 56a through 56n. Switch elements 60 illustratively are field effect transistors connecting word lines 50a through 50p to ground potential. The control is by applying a high signal to the gate of elements 60. Word lines 50a through 50p, when not brought to ground by one of the elements 60, are selected by being held high by a high potential acting through resistors 62a through 62p, each in series with word lines 50a through 50p respectively.

Finally, a high word line 50a through 50p operates on the gate of switch elements 60 connected to output lines 64a through 64m. Lines 64a through 64n, when not brought to ground potential by one of the elements 60, are held high by a high potential action through resistors 66a through 66m.

Switch elements 60 are shown either with or without the conventional gate symbol for a field effect transistor, with those having the gate circled in FIG. 3. This suggests that the gate is not provided during manufacture of the personalized array. Alternatively, of course, all the gates might be provided, but connection to the lines 56a through 56n, 58a through 58n, and 66a through 66m, be made or not made depending on the personalization.

It will be apparent that where no switch element 60 is effectively connected (represented by circle elements 60 in FIG. 3) either to input line, such as 58a, and its inverted signal, such as 56a, to a given word line such as line 50p, the status of that input is insignificant to the result. Specifically in FIG. 3, the status on line 52a does not effect line 50p since the element 60a to which line 58a is directed has no gate and the element 60b to which line 56b is directed has no gate. (This conveniently may be called "don't care" logic.)

With respect to the PLA 19 of the FIG. 1 and FIG. 2 embodiments, the changing address inputs to PLA 19 are responded to by such "don't care" personalization, so that a word line is selected regardless of their status. The unchanging address orders to PLA 19 are responded to by personalization which selects by leaving high only one word line 50a through 50p, with that word line having the "don't care" personalization for the changing address orders. The desired output is that as described and is achieved by simply personalizing the switch elements 60 associated with the word line personalized to be activated so that output lines 64a through 64m carry those signals which conform to this invention as described in the foregoing.

This description of a logic array is intended to be only illustrative, as such arrays are now known in this art and can take various forms which are equivalent with respect to this invention. This invention utilizes individual word lines for substitutions or patches of various sizes by personalizing the logic array so that the changing addresses plays no part in selecting the active word line. Accordingly, each continuous substitution or patch may employ only one word line, even though the changing parts of the received address may be large. This minimizes the number of word lines used, and the number of word lines is limiting structural resource. (As discussed in connection with FIG. 1, in a particular address involving translations or carries in the original address, the use of separate patches may be desirable to economize on the use of the patch memory, EPROM 23.)

Additionally, PLAs and the like are relatively fast compared with memory accessing times or the like. Typically, final usable output is produced from the PLA soon enough that no special wait is provided in the system. With respect to FIG. 1 and FIG. 2, typically control signals appear on line 21 and address signals appear on bus 25 in time to disable ROM 9 and enable EPROM 23 or EPROM 40 without imposing a delay in the timing of the overall system.

Figure 4:
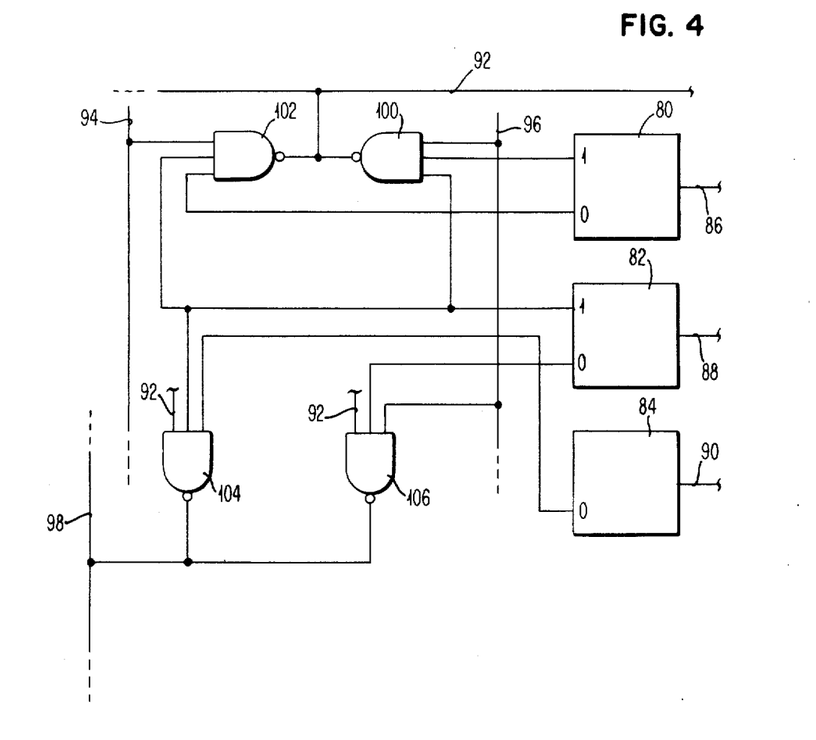
FIG. 4 illustrates a logic system in accordance with this invention in which the logic is variable by associating the logic with memory cells which may be changed by electronic techniques.

FIG. 4 shows one subcircuit of array logic in which the personalization is not fixed in hardware. The full array comprises a two dimensional repetition of the subcircuit of FIG. 1 generally in the manner of FIG. 3 as further described below. Memory cells 80, 82, and 84 may be random access sites having two states, producing a high signal at the output marked 1 in one state and producing a high signal at the output marked 0 in the second state.

More specifically, each cell 80, 82, and 84 may be any standard memory cell, such a a cross-coupled bistable circuit of convenient design, which is driven on control lines 86, 88, and 90 respectively to switch the state from on to off, the on status being arbitrarily considered that in which the 1 output is high and the zero output is low, while the opposite status is that in which the 0 output is high and the 1 output is low.

Line 92 is a word line, comparable to one of the word lines 50a through 50n in FIG. 3. Line 92 is normally biased to a high status of potential. Line 92 is connected to a number of subcircuits, each essentially as shown in FIG. 4. Line 92 is normally held low, the unselected state, and if allowed to go high by the subcircuits as will be described, line 92 is selected and participates in the development of a coded output signal. An entire circuit has a plurality of word lines, such as word line 92, each with the number of subcircuits as in FIG. 4 connected to it equal to the number of input address orders to the array.

Line 94 is the direct input line, corresponding to one of the lines 58a through 58n in FIG. 3. Similarly line 96 carries the inverted signal to that on line 94, corresponding to line 56a when line 94 corresponds to line 58a. Line 98 is also normally biased to a high status of potential. Line 98 carries one output and corresponds to one of the output lines 64a through 64m of FIG. 3. Accordingly, each subcircuit as in FIG. 4 associated with each word line, such as line 92, connects to a different output line such as line 98.

Memory cell 80 is set on when the address order on line 94 is to partially select line 92 when line 94 is high (word line 92 is fully selected when all of the cells partially select line 92 by none of them pulling it to ground). Memory cell 82 is set on when the signals on lines 94 and 96 are to be signals of unchanging address orders (that is, they are not "don't care" signals). Accordingly, when cell 80 is on, cell 82 is on and the line 96 is high, all three inputs of NAND logic element 100 are high, resulting in a low or ground output, which is connected to word line 92 and pulls it down. Word line 92 is positively prevented from selection.

Had the signal on line 94 been high, the signal on line 96 is necessarily low and NAND 100 is not satisfied. The zero signal from cell 80 is one of the three inputs to NAND logic element 102, so it is not satisfied. In that event, neither NAND 100 nor 102 is satisfied and line 92 is partially selected in that it is not pulled low by the subcircuit under consideration.

Should cell 80 be reversed in state, the 0 output is high. That is, the previously low input to NAND 102 is high, and, when line 94 is high and cell 82 is on, NAND 102 is satisfied. In that status, word line 92 is positively prevented from selection.

The 1 output of cell 82 is one of the three inputs to both NAND 100 and NAND 102. When that ouput is low, word line 92 is partially selected regardless of the status of the address signal and its inverse carried on lines 94 and 96, respectively.

Word line 92 or a word line corresponding to word line 92 is selected when all of the subcircuits as in FIG. 4 to which it is connected allow a high signal on the word line 92 or other word line. This high signal appears as one of the three inputs to NAND 104, along with the 1 output of cell 82 and the 0 output of memory cell 84. The 0 output of cell 82 appears as one input the NAND 106, along with word line 92 and inverse line 96. Either NAND 104 or NAND 106 can be satisfied, but not both, depending upon whether cell 82 is set on or off. Cell 82 is set on when an unchanging address signal will appear on lines 94 and 96. Cell 84 is set off when the corresponding order of the substitution address is to be low. Then all inputs to NAND 104 are high and output line 98 is brought low. To allow line 98 to go high, cell 84 is set on. Then a high signal does not appear on the 0 output of cell 84, one of the inputs to NAND 104, and line 98 is not brought low. When cell 82 is set low and word line 92 is selected, the two associated inputs to NAND 106 are high. The other input is the inverted address signal on line 96. When that signal is high, NAND 106 is satisfied and line 98 is brought low. Thus, a signal of low state at the incoming address order results in a low signal on lihe 98. When the signal on line 96 is high, NAND 106 is not satisfied.

Thus, when cell 82 is off, a signal of high state at the incoming address order necessarily means line 96 is low and this results on line 98 not being brought low. An address signal of opposite state causes NAND 106 to bring line 98 low. This operation of NAND 106 as connected may be characterized as pass-through logic selected by the input from word line 92. When selected, the inverse of the signal on line 96 is passed through.

As with the array of FIG. 3, typically only one word line of a group of word lines such as word line 92 is selected. Then NAND circuits corresponding to NAND elements 104 and 106 and related to the selected word line may be activated. Each word line 92 has multiple NAND elements 104 and 106, each connected to a different output line such as line 98. Each of the lines 98 are identically connected to be controlled by all of the word lines.

The foregoing variable circuit of FIG. 4 is relatively costly and complex, and is not preferred. The logic shown is merely illustrative and would be optimized for particular applications. If such a circuit is provided, additional logic and complexity can be added to substitute for various system structures based on the availability of these circuit elements when patch or the like is not being accomplished. This would reduce somewhat the overall cost of providing the memory type circuit.

Fixed PLAs of the general kind illustrated in FIG. 3 are available, practical, inexpensive, reliable, and fast. Since this invention requires only one or a limited number of word lines for each continuous patch or other substitution, such a PLA is well suited for use with this invention.

It will be apparent that memory substitution is not inherently limited to patching from ROM. Accordingly, this invention may be used generally for address substitution.

What is claimed is:

1. Data processing apparatus comprising a first data processing memory addressed by a first group of address signals, a second data processing memory addressed by a second group of address signals, data processing logic to receive said first group of address signals to produce an output comprising a third group of signals, a plurality of individual logic means, each receiving only one signal of said third group of signals and only one signal of said first group of address signals, each said individual logic means producing an output signal which is logically the same as said signal of said first group received by said logic element when said signal of said third group received by said logic element is at a predetermined status, and means to enable said second memory to be addressed employing signals corresponding to said output signals of said logic means as said second group of address signals.

2. Data processing apparatus as in claim 1 in which said data processing logic comprises a logic array having word lines having a selected status and an unselected status, each said word line being brought to an unselected status by a single one of said first group of address signals being in a predetermined status, said array having elements responsive to said word lines in said selected status to produce said third group of signals.

3. Data processing apparatus as in claim 2 in which said logic array is a personalized programmable logic array having said word lines interconnected with input lines receiving said first group of input signals and having output lines interconnected with said word lines.

4. Data processing apparatus as in claim 3 also comprising a fourth group of address signals representing addresses of lowest order significance with respect to said first group of address signals and means communicating said fourth group of signals as addresses of lowest order significance when said second memory is addressed employing said signals produced by said logic means.

5. Data processing apparatus as in claim 2 also comprising a fourth group of address signals representing addresses of lowest order significance with respect to said first group of address signals and means communicating said fourth group of signals as addresses of lowest order significance when said second memory is addressed employing said signals produced by said logic means.

6. Data processing apparatus as in claim 1 also comprising a fourth group of address signals representing addresses of lowest order significance with respect to said first group of address signals and means communicating said fourth group of signals as addresses of lowest order significance when said second memory is addressed employing said signals produced by said logic means.

7. Data processing apparatus comprising a first data processing memory addressed by a first group of binary address signals, said first group of binary address signals being in the order of magnitude of more than ten in number, a second data processing memory addressed by a second group of binary address signals, a logic array connected to receive said first group of address signals, said logic array having in the order of magnitude of less than seventy word lines normally in an unselected status, individual ones of said first group of binary address signals being connected for bringing each said word line to said unselected status, said logic array having circuit elements responsive to selected ones of said word lines to produce an output comprising a third group of binary signals, a plurality of EXCLUSIVE OR logic elements, each receiving both one signal of said third group of signals and one signal of said first group of address signals to produce an output signal, and means to enable said second memory to be addressed employing signals corresponding to signals produced by said EXCLUSIVE OR elements as said second group of address signals.

8. Data processing apparatus as in claim 7 in which said logic array is a personalized programmable logic array having said word lines interconnected with input lines receiving said first group of input signals and having output lines interconnected with said word lines.

9. Data processing apparatus as in claim 8 also comprising a fourth group of binary address signals representing addresses of lowest order significance with respect to said first group of address signals and means communicating said fourth group of signals as addresses of lowest order significance when said second memory is addressed employing said signals produced by said EXCLUSIVE OR elements.

10. Data processing apparatus as in claim 7 also comprising a fourth group of binary address signals representing addresses of lowest order significance with respect to said first group of address signals and means communicating said fourth group of signals as addresses of lowest order significance when said second memory is addressed employing said signals produced by said EXCLUSIVE OR elements.

11. Data processing apparatus for substituting data in a first data processing memory for data in a second data processing memory comprising said first memory, said second memory and logic means to monitor a first group of sequential address signals to enable said first memory and disable said second memory in response to preselected significances of said first group of signals and to generate a second group of sequential signals, said second group of signals being applied to logic elements which respond to a corresponding signal of said first group of address signals to maintain the significance of each signal of said first group of address signals when the signal of said second group is at a first preselected status and to change the significance when the signal of said second group is not at said first preselected status and the signal from said first group is at a second preselected status, the output of said logic elements defining addresses to said first memory, said logic means being personalized so that signals of said second group corresponding to address orders which change in significance while said first memory is enabled will all be at said first preselected status and the other signals of said second group will vary to correspond to the unchanging part of the address of data to be substituted for data in said second memory.

12. Data processing apparatus as in claim 11 in which said logic means comprises a logical array having word lines having a selected status and an unselected status, each said word line being brought to an unselected status by a single one of said first group of address signals being in a predetermined status, said array having elements responsive to said word lines in said selected status to produce said third group of signals.

13. Data processing apparatus as in claim 12 in which said logic array is a personalized programmable logical array having said word lines interconnected with input lines receiving said first group of input signals and having output lines interconnected with said word lines.

14. Data processing apparatus as in claim 13 also comprising a third group of sequential address signals representing addresses of lowest order significance with respect to said first group of address signals and means communicating said third group of signals as addresses of lowest order significance with respect to said output of said logic elements.

15. Data processing apparatus as in claim 12 also comprising a third group of sequential address signals representing addresses of lowest order significance with respect to said first group of address signals and means communicating said third group of signals as addresses of lowest order significance with respect to said output of said logic elements.

16. Data processing apparatus as in claim 11 also comprising a third group of sequential address signals representing addresses of lowest order significance with respect to said first group of address signals and means communicating said third group of signals as addresses of lowest order significance with respect to said output of said logic elements.

* * * * *